(12) United States Patent
Sugito et al.

(10) Patent No.: US 10,926,405 B2
(45) Date of Patent: Feb. 23, 2021

(54) ARM STRUCTURE AND TRANSFERRING APPARATUS

(71) Applicant: Kabushiki Kaisha Toshiba, Tokyo (JP)

(72) Inventors: Ryuji Sugito, Kawasaki (JP); Shin Sakamoto, Yokohama (JP); Toshio Morita, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 267 days.

(21) Appl. No.: 15/807,786

(22) Filed: Nov. 9, 2017

(65) Prior Publication Data
US 2018/0126548 A1 May 10, 2018

(30) Foreign Application Priority Data
Nov. 9, 2016 (JP) .............................. JP2016-218817

(51) Int. Cl.
*B25J 9/10* (2006.01)
*B25J 19/00* (2006.01)
(Continued)

(52) U.S. Cl.
CPC ............... *B25J 9/104* (2013.01); *B25J 5/007* (2013.01); *B25J 9/046* (2013.01); *B25J 19/0008* (2013.01);
(Continued)

(58) Field of Classification Search
CPC ........ B25J 15/0233; B25J 15/00; B25J 9/104; B25J 9/0016; B25J 9/0012; B25J 9/0008
See application file for complete search history.

(56) References Cited

U.S. PATENT DOCUMENTS 3,790,002 A * 2/1974 Germond .................. B25J 9/04
414/735
4,283,165 A * 8/1981 Vertut ...................... B25J 5/007
280/771
(Continued)

FOREIGN PATENT DOCUMENTS

JP 2003-181789 A 7/2003
JP 2011-240487 A 12/2011
(Continued)

*Primary Examiner* — William Kelleher
*Assistant Examiner* — Gregory T Prather
(74) *Attorney, Agent, or Firm* — Oblon, McClelland, Maier & Neustadt, L.L.P.

(57) ABSTRACT

According to one embodiment, an arm structure includes a base, a first link, a second link, a connecting member, and a gravity compensation mechanism. The first and the second links are rotatable in a vertical direction. One end side of the first link is pivotally attached to the base via a first rotating shaft. One end side of the second link is pivotally attached to another end side of the first link via a second rotating shaft. A length of the first link is same as a length of the second link. The second link rotates around the second rotating shaft. A rotation angle of the second link is twice a rotation angle of the first link. A rotation direction of the second link is opposite to a rotation direction of the first link. The gravity compensation mechanism compensates for torque generated around the first rotating shaft by gravity.

30 Claims, 7 Drawing Sheets

(51) Int. Cl.
*B25J 5/00* (2006.01)
*B25J 9/04* (2006.01)
*F16H 37/16* (2006.01)
*F16H 37/12* (2006.01)

(52) U.S. Cl.
CPC .......... *B25J 19/0016* (2013.01); *F16H 37/12* (2013.01); *F16H 37/16* (2013.01); *F16H 2037/128* (2013.01)

(56) References Cited

U.S. PATENT DOCUMENTS

| | | | | | |
|---|---|---|---|---|---|
| 4,500,251 | A | * | 2/1985 | Kiryu | B25J 9/047 248/123.11 |
| 4,592,697 | A | * | 6/1986 | Tuda | B25J 9/046 267/71 |
| 4,775,289 | A | * | 10/1988 | Kazerooni | B23Q 11/0021 414/735 |
| 5,332,181 | A | * | 7/1994 | Schweizer | A61B 6/4405 248/123.11 |
| 6,145,403 | A | * | 11/2000 | Aschenbrenner | B25J 19/0008 361/144 |
| 10,421,196 | B2 | * | 9/2019 | Furukawa | B25J 15/0052 |
| 2002/0094265 | A1 | * | 7/2002 | Momoki | B25J 9/042 414/744.5 |
| 2005/0217053 | A1 | * | 10/2005 | Kim | B25J 9/0084 15/250.21 |
| 2006/0245894 | A1 | * | 11/2006 | Merz | B25J 9/104 414/680 |
| 2007/0265731 | A1 | * | 11/2007 | Merk | B25J 9/102 700/245 |
| 2008/0210477 | A1 | * | 9/2008 | Takenaka | B25J 19/0012 180/8.6 |
| 2010/0207412 | A1 | * | 8/2010 | Okazaki | B25J 9/104 294/106 |
| 2010/0212305 | A1 | * | 8/2010 | Runesson | B25J 19/0012 60/327 |
| 2011/0072930 | A1 | * | 3/2011 | Bayer | B25J 19/0012 74/490.01 |
| 2011/0320038 | A1 | * | 12/2011 | Motoki | B25J 19/0008 700/245 |
| 2012/0186379 | A1 | * | 7/2012 | Miyamoto | B25J 19/0012 74/490.01 |
| 2012/0186380 | A1 | * | 7/2012 | Yamada | B25J 19/0012 74/490.01 |
| 2013/0187022 | A1 | * | 7/2013 | Duportal | G01B 5/008 248/543 |
| 2014/0202276 | A1 | * | 7/2014 | Song | B25J 9/046 74/490.05 |
| 2014/0290414 | A1 | * | 10/2014 | Hasuo | B25J 19/0012 74/490.01 |
| 2014/0297037 | A1 | * | 10/2014 | Hayashi | B25J 19/0012 700/258 |
| 2015/0174770 | A1 | * | 6/2015 | Kagawa | B25J 19/0008 74/490.01 |
| 2016/0325441 | A1 | * | 11/2016 | Harada | B25J 19/0012 |
| 2017/0038189 | A1 | * | 2/2017 | Jordil | B25J 9/1035 |
| 2019/0030726 | A1 | * | 1/2019 | Furukawa | B25J 9/042 |
| 2019/0077026 | A1 | * | 3/2019 | Jogasaki | A61B 34/71 |

FOREIGN PATENT DOCUMENTS

| | | |
|---|---|---|
| JP | 2014-124742 A | 7/2014 |
| JP | 2015-66673 A | 4/2015 |
| JP | 2015-213976 A | 12/2015 |

* cited by examiner

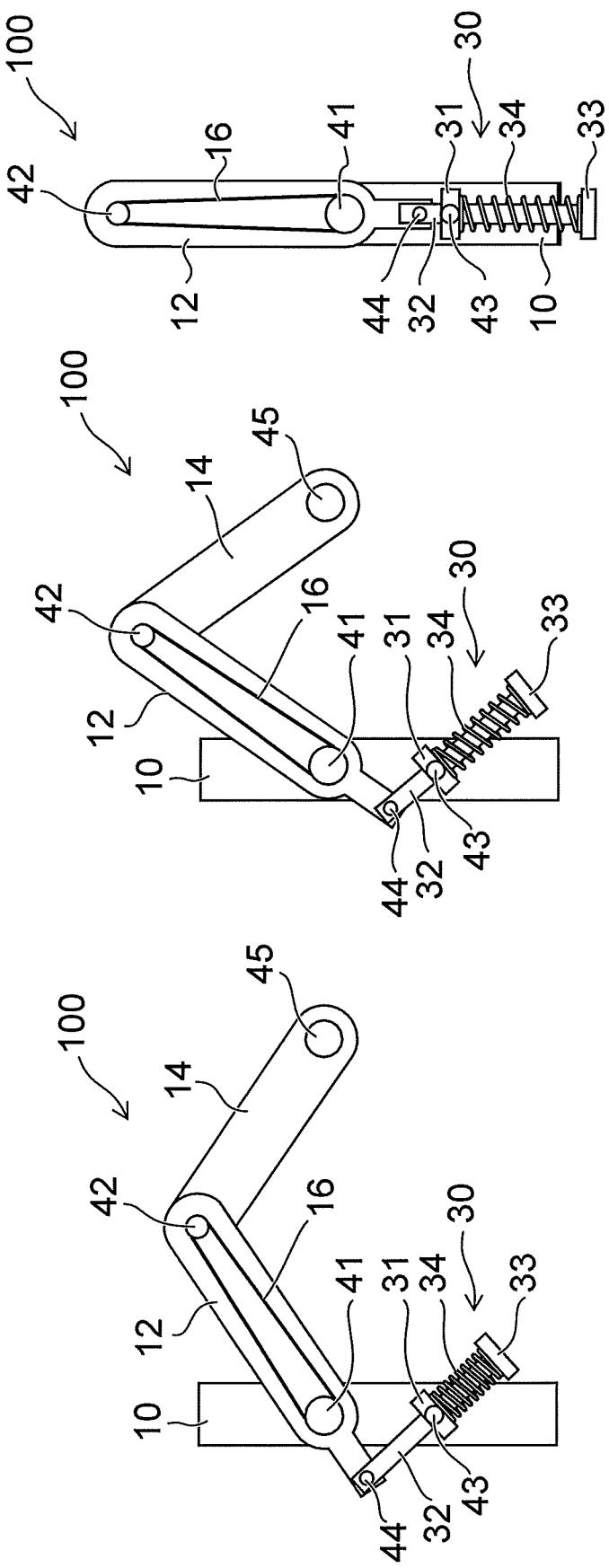

ARM STRUCTURE AND TRANSFERRING APPARATUS

CROSS-REFERENCE TO RELATED APPLICATIONS

This application is based upon and claims the benefit of priority from Japanese Patent Application No. 2016-218817, filed on Nov. 9, 2016; the entire contents of which are incorporated herein by reference.

FIELD

Embodiments described herein relate generally to an arm structure and a transferring apparatus.

BACKGROUND

There is an arm structure including a gravity compensation mechanism. The gravity compensation mechanism compensates for the torque generated around the rotating shaft of the link by gravity. By providing the gravity compensation mechanism, the output of the motor that drives the link can be lowered. The motor and the arm structure can be downsized.

In the arm structure including such a gravity compensation mechanism, further reduction in output of the motor is desired.

BRIEF DESCRIPTION OF THE DRAWINGS

FIG. 2A to FIG. 2C are schematic diagrams showing a state when a first link, included in the arm structure according to the first embodiment, is rotated;

DETAILED DESCRIPTION

Figure 1:
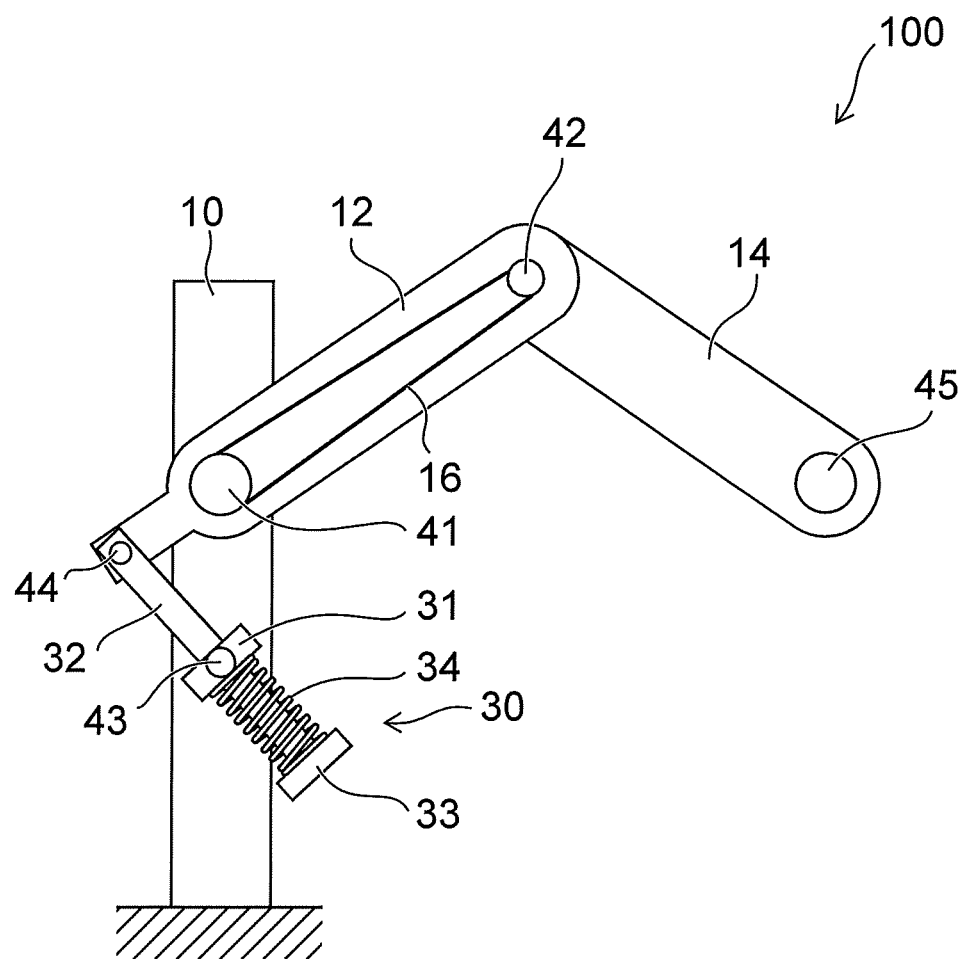
FIG. 1 is a schematic diagram showing an arm structure according to a first embodiment.

According to one embodiment, an arm structure includes a base, a first link, a second link, a connecting member, and a gravity compensation mechanism. The first link is rotatable in a vertical direction. One end side of the first link is pivotally attached to the base via a first rotating shaft. The second link is rotatable in the vertical direction. One end side of the second link is pivotally attached to another end side of the first link via a second rotating shaft. A length of the first link is same as a length of the second link. The connecting member connects the first rotating shaft and the second rotating shaft. When the first link rotates around the first rotating shaft, the second link rotates around the second rotating shaft. A rotation angle of the second link is twice a rotation angle of the first link. A rotation direction of the second link is opposite to a rotation direction of the first link. The gravity compensation mechanism is connected to the base and the first link. The gravity compensation mechanism compensates for torque generated around the first rotating shaft by gravity.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1 is a schematic diagram showing an arm structure 100 according to the first embodiment.

FIG. 2A to FIG. 2C are schematic diagrams showing a state when the first link 12, included in the arm structure 100 according to the first embodiment, is rotated.

As shown in FIG. 1, the arm structure 100 includes a base 10, a first link 12, a second link 14, a connecting member 16, and a gravity compensation mechanism 30.

One end side of the first link 12 is pivotally attached to the base 10 via the rotating shaft 41. One end side of the second link 14 is pivotally attached to the other end side of the first link 12 via the rotating shaft 42. That is, the first link 12 and the second link 14 are connected in series.

The first link 12 and the second link 14 are provided so as to be rotatable in the vertical direction. The length of the first link 12 is equal to the length of the second link 14. On the other end side of the second link 14, for example, a rotating shaft 45 is provided. A robot hand (not shown) is pivotally attached to the second link 14 via this rotating shaft 45.

In this specification, "pivotally attached" means that one member is rotatably connected to the other member. The length of the first link 12 is the distance between the rotation center of the rotating shaft 41 and the rotation center of the rotating shaft 42. The length of the second link 14 is the distance between the rotation center of the rotating shaft 42 and the rotation center of the rotating shaft 45.

A motor (not shown) is connected to the rotating shaft 41. As this motor rotates the rotating shaft 41, the first link 12 rotates in the vertical direction with respect to the base 10.

The rotating shaft 41 and the rotating shaft 42 are connected by a connecting member 16 so as to rotate in the same direction. For example, the rotating shaft 41 and the rotating shaft 42 are provided with pulleys. A belt or a chain as the connecting member 16 is attached to these pulleys. Thereby, the rotating shaft 41 and the rotating shaft 42 are connected.

In the case where pulleys are provided on the rotating shaft 41 and the rotating shaft 42, the diameter of the pulley of the rotating shaft 41 is set to twice the diameter of the pulley of the rotating shaft 42. These rotating shafts are connected by the connecting member 16. According to this configuration, when the first link 12 rotates around the rotating shaft 41, the second link 14 rotates around the rotating shaft 42. The rotation direction of the second link 14 is opposite to the rotation direction of the first link 12. The rotation angle of the second link 14 is twice the rotation angle of the first link 12.

As the connecting member 16, a rod or the like may be connected to the rotating shaft 41 and the rotating shaft 42. In order to widen the movable range of the first link 12 with respect to the base 10, it is preferable to use an endless one such as a belt or a chain as the connecting member 16.

The lengths of the first link 12 and the second link 14 are equal, the rotation angle of the second link 14 is twice the rotation angle of the first link 12, and these rotating shafts are connected. According to this configuration, as shown in FIG. 2A to FIG. 2C, when the first link 12 is rotated around the rotating shaft 41, the other end side of the second link 14 (the rotating shaft 45) moves in the horizontal direction according to the rotation of the first link 12.

The gravity compensation mechanism 30 is connected to the base 10 and the first link 12. The gravity compensation mechanism 30 compensates for the torque generated around the rotating shaft 41 by gravity. As shown in FIG. 1, the gravity compensation mechanism 30 has a guide 31, a rod 32, a spring receiving portion 33, and a spring 34.

The guide 31 is pivotally attached to the base 10 via the rotating shaft 43. The rotating shaft 43 is positioned below the rotating shaft 41. A rod 32 is inserted inside the guide 31.

The rod 32 is supported by the guide 31 (the rotating shaft 43) so as to be movable along the axial direction of the rod 32. One end side of the rod 32 is pivotally attached to one end side of the first link 12 via the rotating shaft 44. The rotating shaft 44 is located above the guide 31. The rotating shaft 44 is provided on one end side of the first link 12 with respect to the rotating shaft 41. That is, the rotating shaft 41 is positioned between the rotating shaft 42 and the rotating shaft 44.

The spring receiving portion 33 is provided on the other end side of the rod 32. The spring 34 is provided between the guide 31 and the spring receiving portion 33. Both ends of the spring 34 are in contact with the guide 31 and the spring receiving portion 33. When the first link 12 is inclined with respect to the vertical direction, the spring 34 is in a compressed state.

For example, the first link 12 rotates counterclockwise around the rotating shaft 41. At this time, as shown in FIG. 2A to FIG. 2C, the position of the rotating shaft 44 changes, and the rod 32 rotates in the clockwise direction. The rod 32 slides downward with respect to the guide 31. As a result, the distance between the guide 31 and the spring receiving portion 33 becomes long, and the elastic force of the spring 34 becomes small.

For example, the first link 12 rotates clockwise around the rotating shaft 41. At this time, the distance between the guide 31 and the spring receiving portion 33 becomes short, and the elastic force of the spring 34 increases.

As described above, the gravity compensation mechanism 30 utilizes the change in the elastic force of the spring 34 as the first link 12 rotates. As a result, the gravity compensation mechanism 30 compensates for the torque generated around the rotating shaft 41 by gravity.

The gravity compensation in the arm structure 100 according to the embodiment will be described in more detail with reference to FIG. 3A and FIG. 3B.

Figure 3B:
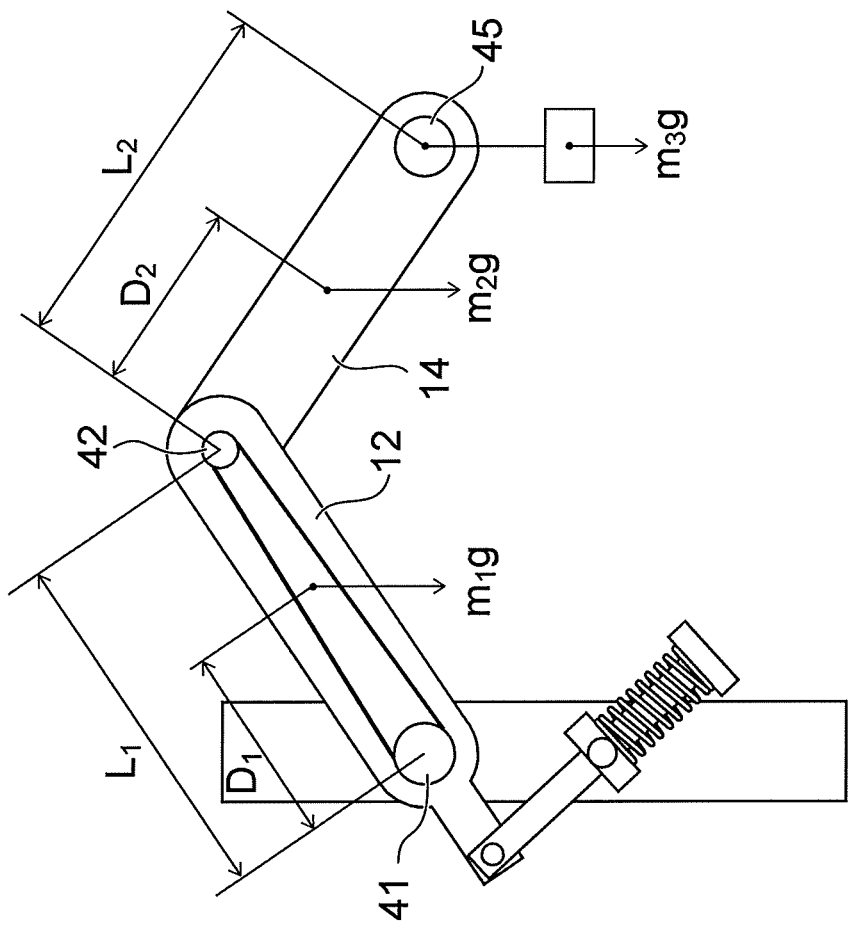
FIG. 3A is an enlarged schematic view of a vicinity of a gravity compensation mechanism of the arm structure according to the first embodiment and FIG. 3B is a schematic view showing a state when the arm structure according to the first embodiment holds an object.
Figure 3A:
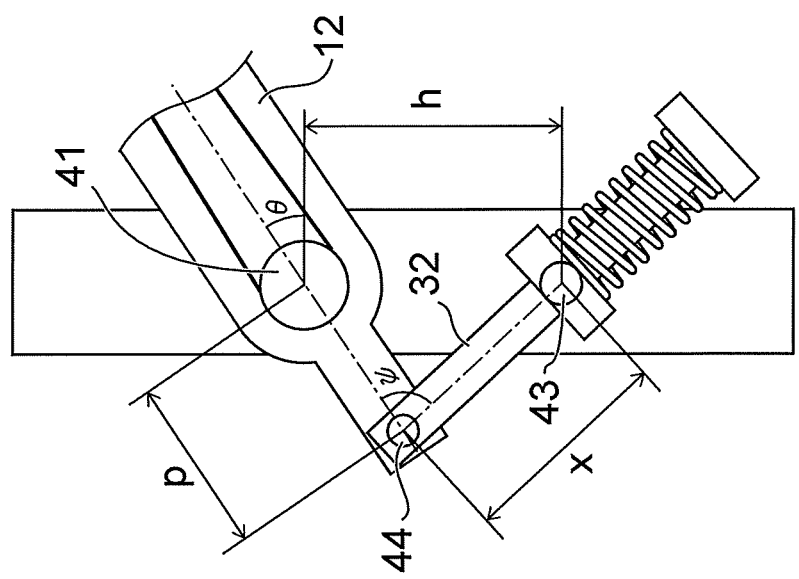

FIG. 3A is an enlarged schematic view of the vicinity of the gravity compensation mechanism 30 of the arm structure 100 according to the first embodiment. FIG. 3B is a schematic view showing a state when the arm structure 100 according to the first embodiment holds an object.

In FIG. 3A, h is the distance between the rotating shaft 41 and the rotating shaft 43. p is the distance between the rotating shaft 41 and the rotating shaft 44. x is the distance between the rotating shaft 43 and the rotating shaft 44. θ is the inclination of the first link 12 with respect to the horizontal direction. Ψ is the angle between the first link 12 and the rod 32. In this example, the natural length of the spring is equal to the distance between the rotating shaft 44 and the spring receiving part 33. That is, in the example shown in FIG. 3A, the spring is reduced by the distance x from the natural length.

In this case, the torque $T_s$, expressed by the following equation (1), occurs in the counterclockwise direction around the rotating shaft 41 by the gravity compensation mechanism 30.

$$T_s = pkx \sin \Psi = hpk \cos \theta \quad (1)$$

In FIG. 3B, $L_1$ is the length of the first link 12. $L_2$ is the length of the second link 14. $D_1$ is a distance between the rotation center of the rotating shaft 41 and the center of gravity of the first link 12. $D_2$ is a distance between the rotation center of the rotating shaft 42 and the center of gravity of the second link 14. $m_1$ is the weight of the first link 12. $m_2$ is the weight of the second link 14. At the other end of the second link 14, an object with a load $m_3$ is held. $r_1$ is the diameter of the pulley provided on the rotating shaft 41. $r_2$ is the diameter of the pulley provided on the rotating shaft 42. g is the gravitational acceleration.

In this case, a torque $T_m$, expressed by the following equation (2), occurs around the rotating shaft 41 in the clockwise direction.

$$T_m = m_1 g D_1 \cos\theta + m_2 g(L_1 + D_2)\cos\theta + \\ m_3 g(L_1 + L_2)\cos\theta - \frac{r_1}{r_2}(m_2 g D_2 \cos\theta + m_3 g L_2 \cos\theta) \quad (2)$$

By substituting $r_1 = 2r_2$ and $L_1 = L_2 = L$ into the equation (2), the following equation (3) is obtained.

$$T_m = m_1 g D_1 \cos\theta + m_2 g(L_1 + D_2)\cos\theta + 2m_3 g L \cos\theta - 2m_2 g D_2 \cos\theta - 2m_3 g L \cos\theta \quad (3)$$

On the right side of equation (3), the sum of the third term and the fifth term is 0. Therefore, the equation (3) is expressed by the following equation (4).

$$T_m = \{m_1 g D_1 + m_2 g(L - D_2)\} \cos\theta \quad (4)$$

In the case where the torque $T_s$ expressed by the equation (1) is equal to the torque $T_m$ expressed by the equation (4), the torque generated around the rotating shaft 41 due to gravity balances with the torque generated around the rotating shaft 41 by the gravity compensation mechanism 30. From the equations (1) and (4), it is found that the balance of the two torques is obtained when the spring constant k of the spring 34 is expressed by the following equation (5).

$$k = \frac{\{m_1 g D_1 + m_2 g(L - D_2)\}}{hp} \quad (5)$$

The operation and effects of the arm structure 100 according to the first embodiment will be described.

The arm structure 100 according to the present embodiment includes the first link 12, the second link 14, the connecting member 16, and the gravity compensation mechanism 30, as described above. The first link 12 and the second link 14 respectively rotate in the vertical direction with respect to the base 10.

In the case where the first link 12 and the second link 14 rotate in the horizontal direction, the connecting portion between the first link 12 and the second link 14 protrudes in the horizontal direction. Therefore, the area required for the operation of the arm structure 100 is increased.

In the arm structure 100 according to the present embodiment, the first link 12 and the second link 14 rotate in the vertical direction. Therefore, the connecting portion between the first link 12 and the second link 14 does not extend in the horizontal direction. It is possible to reduce the area required for the operation of the arm structure 100.

The rotating shaft 41 and the rotating shaft 42 are connected by a connecting member 16. Thereby, when the first link 12 rotates around the rotating shaft 41, the second link 14 rotates in the opposite direction around the rotating shaft 42. The rotation angle of the second link 14 is twice the rotation angle of the first link 12.

According to such a configuration, as shown in the equations (2) and (3), the term including the load $m_3$ of the object held by the second link 14 is excluded from the torque $T_m$ generated in the rotating shaft 41.

According to the present embodiment, it is possible to mechanically compensate the torque generated by the load of the object while reducing the area required for the operation of the arm structure 100. By mechanically compensating the torque generated by the load of the object, it becomes possible to operate the link with a motor with a lower output. It is possible to reduce power consumption and downsize the arm structure 100.

Since the rotating shaft 41 and the rotating shaft 42 are connected to each other, the torque generated around the rotating shaft 42 can also be compensated by the gravity compensation mechanism 30. Therefore, it is unnecessary to additionally provide a gravity compensation mechanism for compensating for the torque generated around the rotating shaft 42. Also from this point, the arm structure 100 can be downsized.

Further, it is preferable to provide the spring 34 for the gravity compensation mechanism having the spring constant k expressed by the equation (5). Thereby, the torque generated by the elastic force of the spring 34 can be balanced with the torque generated by the gravity. That is, the torque generated around the rotating shaft 41 due to gravity can be completely compensated for at any angle θ. Therefore, it is possible to further reduce the output of the motor necessary for the link operation and to further reduce the size of the arm structure 100.

Second Embodiment

Figure 4:
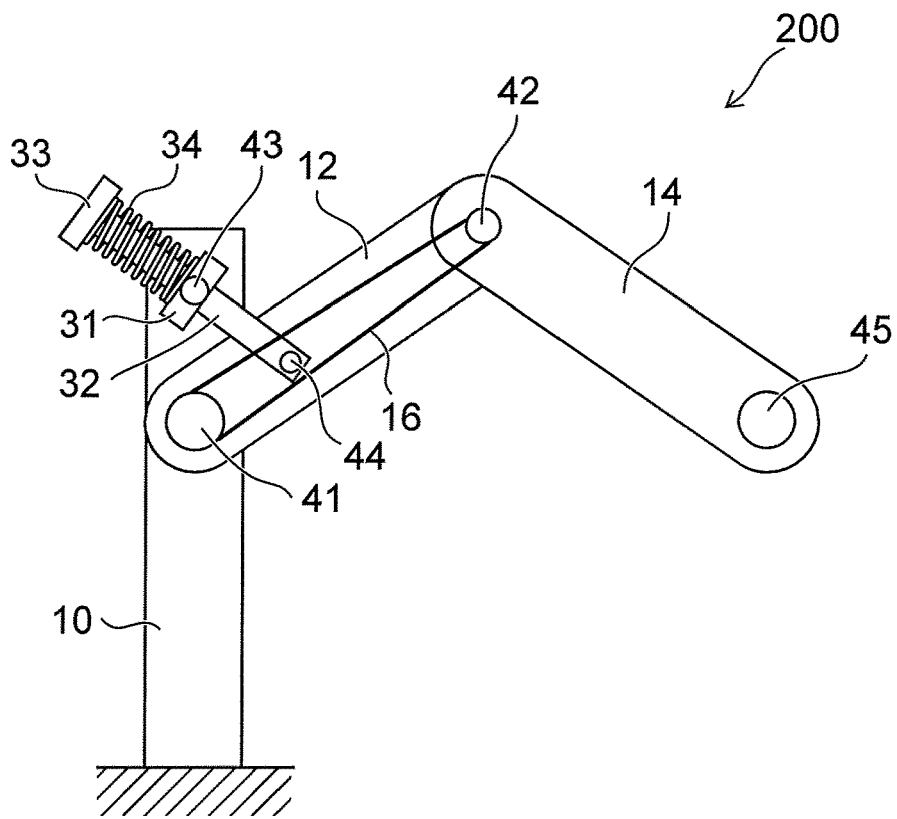
FIG. 4 is a schematic diagram showing an arm structure according to a second embodiment.

FIG. 4 is a schematic diagram showing the arm structure 200 according to the second embodiment.

In the arm structure 200 according to the present embodiment, the position of the gravity compensation mechanism 30 is different from the arm structure 100.

In the arm structure 200, the gravity compensation mechanism 30 is provided above the rotating shaft 41. That is, the guide 31 and the rotating shaft 43 are located above the rotating shaft 41 on the base 10. The rod 32 is pivotally attached to the first link 12 via the rotating shaft 44. The rotating shaft 44 is located below the guide 31. The rotating shaft 44 is positioned between the rotating shaft 41 and the rotating shaft 42.

The configuration of the arm structure 200 other than the gravity compensation mechanism 30 is the same as that of the arm structure 100. When the first link 12 rotates around the rotating shaft 41, the second link 14 rotates in the opposite direction around the rotating shaft 42. At this time, the rotation angle of the second link 14 is twice the rotation angle of the first link 12.

According to the present embodiment, as in the first embodiment, the torque generated by the load of the object is mechanically compensated. Therefore, it is possible to operate links with a lower output motor. The arm structure 200 can be downsized.

Similarly to the first embodiment, by using the spring 34 having the spring constant k expressed by the equation (5), it is possible to compensate the torque generated around the rotating shaft 41 at any angle θ.

Third Embodiment

Figure 5:
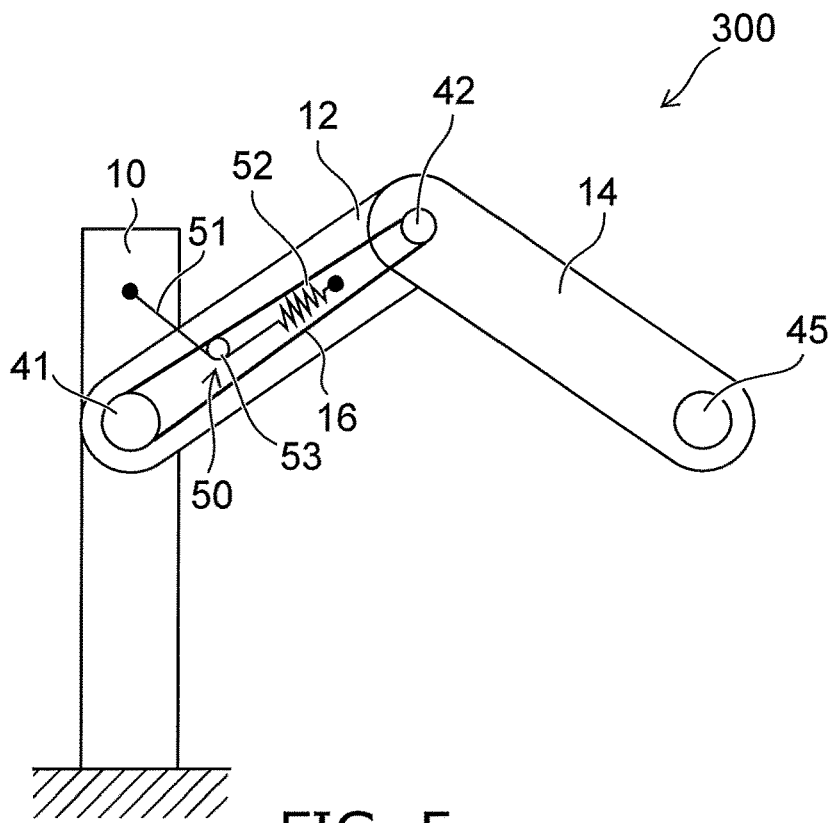
FIG. 5 is a schematic diagram showing an arm structure according to a third embodiment.

FIG. 5 is a schematic diagram showing the arm structure 300 according to the third embodiment.

The arm structure 300 is different from the arm structure 100 in that the gravity compensation mechanism 50 is provided instead of the gravity compensation mechanism 30.

Specifically, the gravity compensation mechanism 50 of the arm structure 300 includes a wire 51, a spring 52, and a pulley 53. One end of the wire 51 is connected to the base 10 above the rotating shaft 41. One end of the spring 52 is connected to the first link 12 between the rotating shaft 41 and the rotating shaft 42. The other end of the wire 51 is connected to the other end of the spring 52.

The pulley 53 is provided on the first link 12. The pulley 53 is positioned between the rotating shaft 41 and the rotating shaft 42. The wire 51 is in contact with the pulley 53. The extending direction of the wire 51 is changed at the pulley 53. That is, one end side of the wire 51 extends along a direction crossing the longitudinal direction of the first link 12. The other end side of the wire 51 extends along the longitudinal direction of the first link 12.

Also in the arm structure 300 according to the present embodiment, like the first embodiment, it is possible to mechanically compensate the torque generated by the load of the object. The arm structure 300 can be downsized.

Similarly to the first embodiment, by using the spring 52 having the spring constant k expressed by the equation (5), it is possible to compensate the torque generated around the rotating shaft 41 at any angle θ.

Fourth Embodiment

Figure 6:
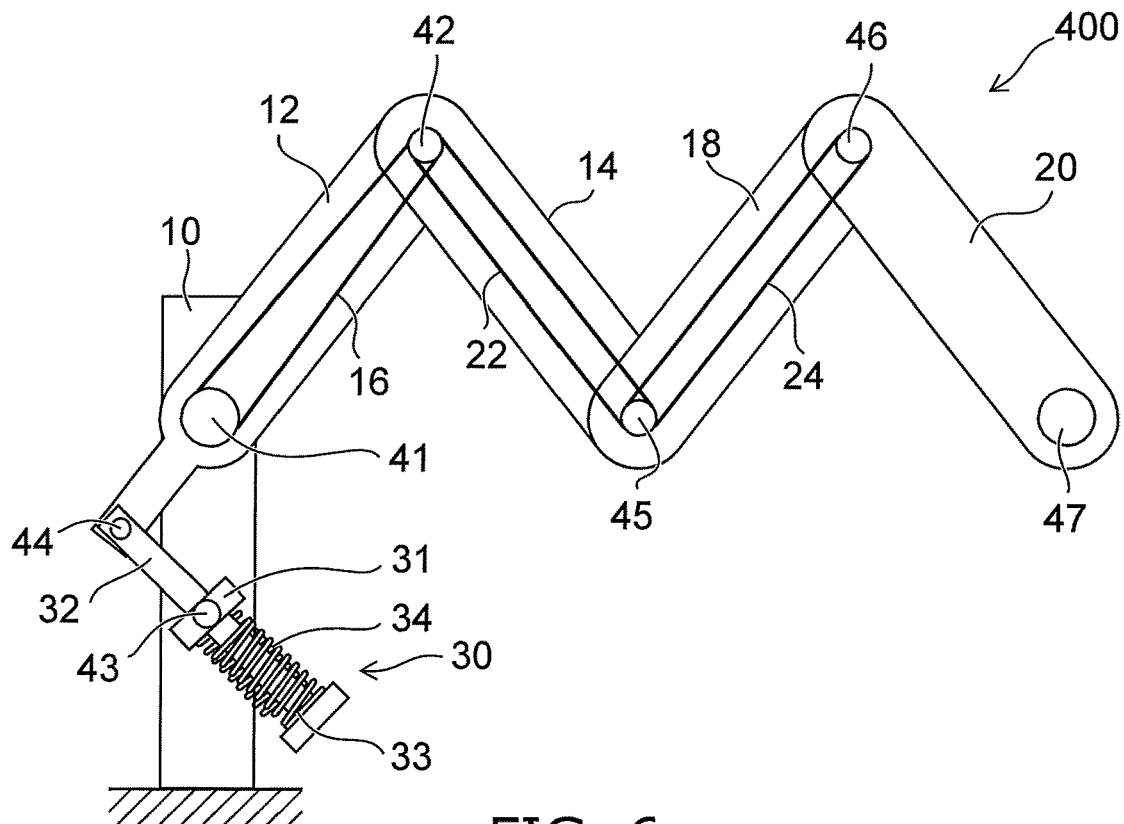
FIG. 6 is a schematic diagram showing ab arm structure according to a fourth embodiment.

FIG. 6 is a schematic diagram showing the arm structure 400 according to the fourth embodiment.

Figure 7:
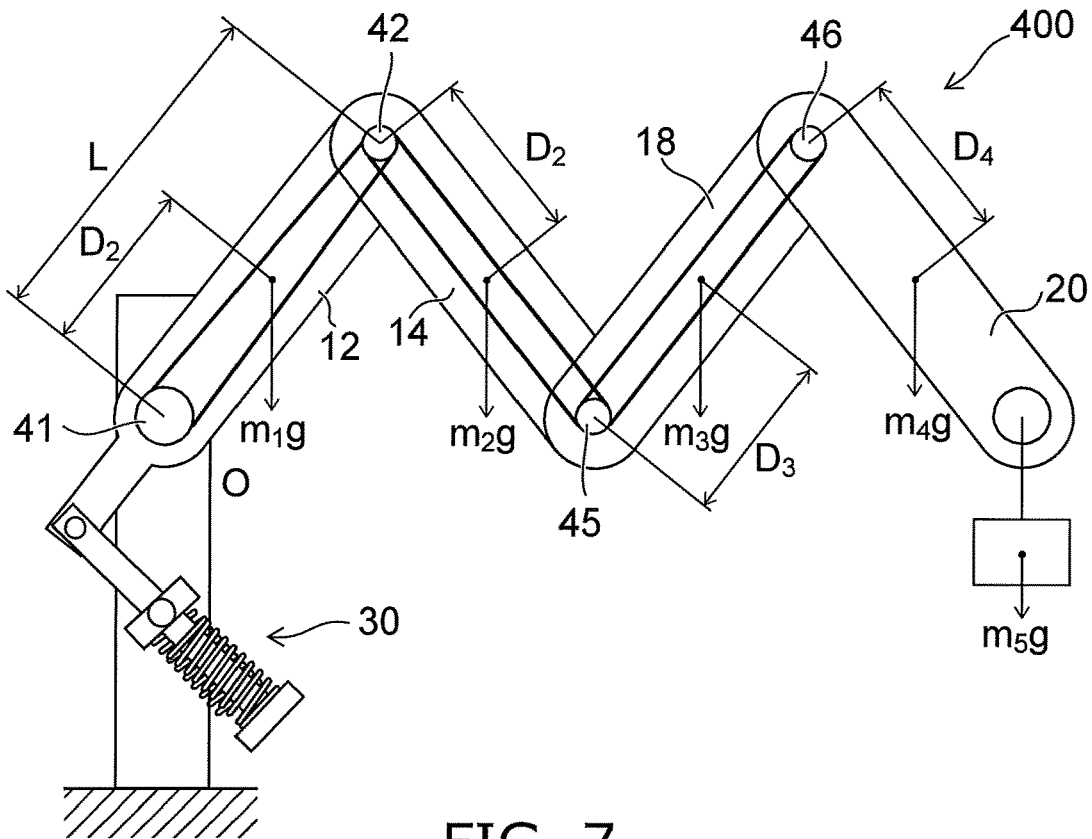
FIG. 7 is a schematic diagram showing a state where an arm structure according to a fourth embodiment holds an object.

FIG. 7 is a schematic diagram showing a state where the arm structure 400 according to the fourth embodiment holds an object.

The arm structure 400 further includes a third link 18, a fourth link 20, a connecting member 22, and a connecting member 24 in comparison with the arm structure 100.

One end side of the third link 18 is pivotally attached to the other end side of the second link 14 via the rotating shaft 45. One end side of the fourth link 20 is pivotally attached to the other end side of the third link 18 via the rotating shaft 46. On the other end side of the fourth link 20, for example, a rotating shaft 47 is provided, and a robot hand is pivotally attached to this rotating shaft. Each length of the third link 18 and the fourth links 20 is equal to each length of the first link 12 and the second link 14.

The length of the third link 18 means the distance between the rotating shaft 45 and the rotating shaft 46. The length of the fourth link 20 means the distance between the rotating shaft 46 and the rotating shaft 47.

The rotating shaft 42 and the rotating shaft 45 are connected by a connecting member 22. The rotating shaft 45 and the rotating shaft 46 are connected by a connecting member 24. Therefore, when the first link 12 rotates around the rotating shaft 41, the second link 14 and the fourth link 20 rotate in a direction opposite to that of the first link 12. The third link 18 rotates in the same direction as the first link 12. When the first link 12 rotates, each of the rotation angles of the second link 14, the third link 18, and the fourth link 20 is twice the rotation angle of the first link 12.

With reference to FIG. 7, the torque generated around the rotating shaft 41 in the arm structure 400 will be described.

$m_3$ is the weight of the third link 18. $m_4$ is the weight of the fourth link 20. On the other end of the fourth link 20, an object with a load $m_5$ is held. $D_3$ is a distance between the rotating shaft 45 and the center of gravity of the third link 18. $D_4$ is a distance between the rotating shaft 46 and the center of gravity of the fourth link 20.

The length of each link is equal to each other. The diameter of the pulley provided on the rotating shaft 41 is twice the diameter of each of the pulleys provided on the other rotating shafts. In this case, the torque $T_m$ generated around the rotating shaft 41 by gravity is expressed by the following equation (6).

$$T_m = \{m_1 g D_1 + m_2 g(L-D_2) + m_3 g D_3 + m_4 g(L-D_4)\} \cos\theta \quad (6)$$

The equation (6) does not include the load $m_5$. When another link is connected in series to the second link 14, the adjacent rotating shafts are connected to each other, and the length of each link and the rotation amount of each link are adjusted. As a result, the torque generated by the load $m_5$ of the held object can be mechanically compensated.

By using the spring 34 for the gravity compensation mechanism having the spring constant k expressed by the following equation (7), the torque $T_m$ expressed by the equation (6) can be completely compensated.

$$k = \frac{\{m_1 D_1 + m_2 g(L - D_2) + m_3 g D_3 + m_4 g(L - D_4)\}}{hp} \quad (7)$$

Still other links may be connected in series in front of the fourth link 20. For example, 2n (n is an integer of 1 or more) links are connected in series. The lengths of the links are equal to each other. The diameter of the pulley provided on the rotating shaft 41 is twice the diameter of each of the pulley provided on the other rotating shaft. In this case, the torque $T_m$ generated around the rotating shaft 41 by gravity is expressed by the following equation (8).

$$T_m = [\Sigma_{i=1}^n (m_{2i-1} g D_{2i-1}) + \Sigma_{i=1}^n \{m_{2i} g(L - D_{2i})\}] \cos\theta \quad (8)$$

By using the spring 34 for the gravity compensation mechanism having a spring constant expressed by the following equation (9), the torque $T_m$ expressed by the equation (8) can be completely compensated.

$$k = \frac{\left[\sum_{i=1}^n (m_{2i-1} g D_{2i-1}) + \sum_{i=1}^n \{m_{2i} g(L - D_{2i})\}\right]}{hp} \quad (9)$$

In this way, more than two, even number of links may be connected in series. It is possible to mechanically compensate the torque generated by the load $m_5$ of the held object. In addition, it is possible to compensate the torque generated around the rotating shaft 41 by the gravity compensation mechanism 30.

In the example described above, the case where a plurality of links are further connected to the arm structure 100 according to the first embodiment has been described. Similarly, in the arm structure according to the second embodiment or the third embodiment, it is also possible to connect other links.

Fifth Embodiment

Figure 8:
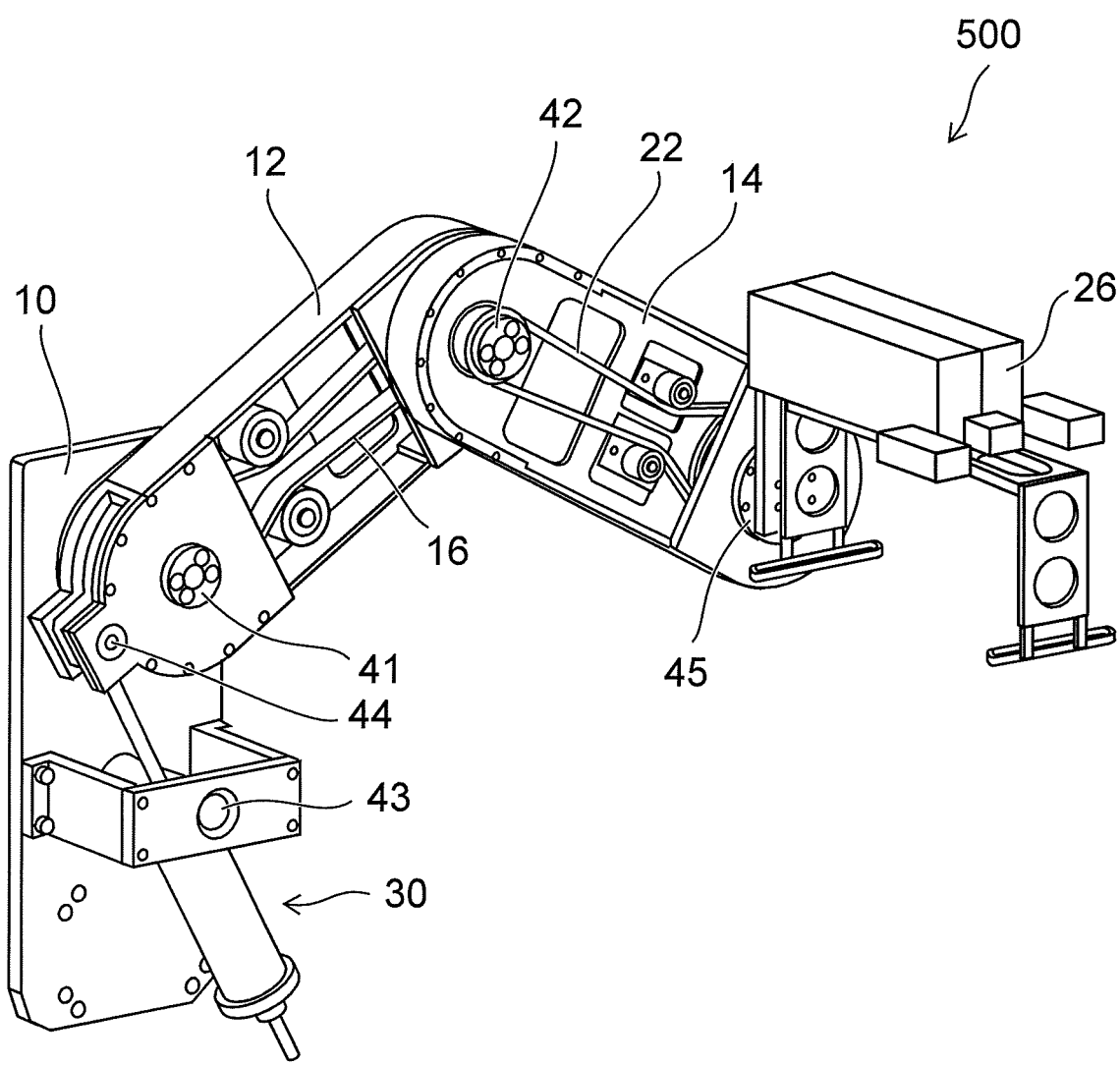
FIG. 8 is a perspective view showing an arm structure according to a fifth embodiment.

FIG. 8 is a perspective view showing the arm structure 500 according to the fifth embodiment.

The arm structure 500 further includes a connecting member 22 and a hand 26 as compared with the arm structure 100.

The hand 26 is pivotally attached to the other end side of the second link 14 via the rotating shaft 45. The hand 26 includes a pair of claws. The hand 26 changes the distance between these claws. Thereby, it is possible to sandwich and lift the object or to place the object at a predetermined place.

The shape and structure of the hand 26 can be appropriately changed in accordance with the shape, load, and the like of the object held by the arm structure 500.

The connecting member 22 connects the rotating shaft 42 and the rotating shaft 45. When the rotating shaft 42 rotates along the vertical direction, the rotation direction of the rotating shaft 45 is the same as the rotation direction of the rotating shaft 42. The rotation angle of the rotating shaft 45 is one half of the rotation angle of the rotating shaft 42. According to such a configuration, even when the first link 12 is rotated, the inclination of the hand 26 pivoted to the rotating shaft 45 does not change. Therefore, it is possible to stably hold the object by the hand 26.

In the example described above, the connecting member 22 and the hand 26 are provided for the arm structure 100 according to the first embodiment. Similarly to the arm structure according to the second embodiment or the third embodiment, it is also possible to provide the connecting member 22 and the hand 26.

Sixth Embodiment

Figure 9:
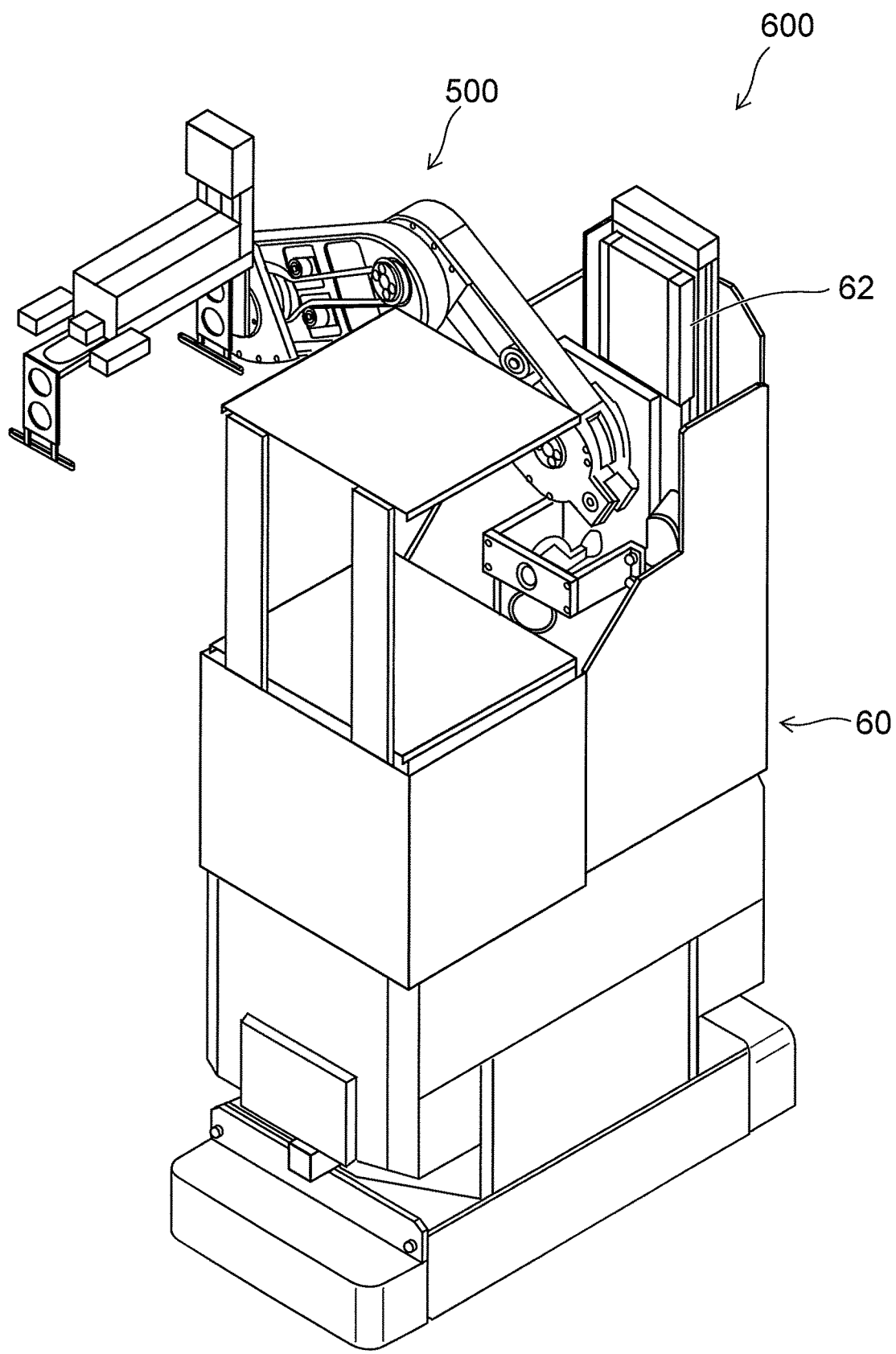
FIG. 9 is a perspective view showing a transfer device 600 according to the sixth embodiment.

FIG. 9 is a perspective view showing a transferring apparatus 600 according to the sixth embodiment.

The transferring apparatus 600 includes an arm structure 500 and an automatic guided vehicle 60. The automatic guided vehicle 60 travels automatically along a track installed on the floor surface. The automatic guided vehicle 60 includes an elevating table 62. The automatic guided vehicle 60 changes the position in the vertical direction of the hand 26 by driving the elevating table 62 along the vertical direction.

As described above, the transferring apparatus 600 includes an arm structure according to any one of the embodiments. The arm structure is mounted on the automatic guided vehicle 60. This makes it possible to downsize the transferring apparatus 600.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. An arm structure comprising:
   a base;
   a first link rotatable in a vertical direction, one end side of the first link being pivotally attached to the base via a first rotating shaft;
   a second link rotatable in the vertical direction, one end side of the second link being pivotally attached to another end side of the first link via, a second rotating shaft;
   a connecting member connecting the first rotating shaft and the second rotating shaft so that the second link rotates around the second rotating shaft according to a rotation of the first link around the first rotating shaft, a rotation direction of the second link being opposite to a rotation direction of the first link; and
   a gravity compensation mechanism connected to the base and the first link, the gravity compensation mechanism compensating for torque generated around the first rotating shaft by gravity, wherein
   another end side of the second link moves in a first direction according to the rotation of the first link
   the first direction crosses the vertical direction.

2. The arm structure according to claim 1, wherein the gravity compensation mechanism includes:
   a guide pivotally attached to the base via a third rotating shaft located below the first rotating shaft;
   a rod supported by the guide, the rod being slidable with respect to the guide, one end side of the rod being pivotally attached to the one end side of the first link via a fourth rotating shaft located above the guide, the first rotating shaft being located between the second rotating shaft and the fourth rotating shaft, the rod moving in an axial direction of the rod according to the rotation of the first link;
   a spring receiving portion provided on another end side of the rod; and
   a spring provided between the guide and the spring receiving portion, an elastic force balancing with the torque being generated by changing a length of the spring in response to movement of the rod.

3. The arm structure according to claim 2, wherein
   a length of the first link being same as a length of the second link,
   a rotation angle of the second link being twice a rotation angle of the first link, and
   a weight $m_1$ of the first link, a weight $m_2$ of the second link, a length L of each of the first link and the second link, a distance $D_1$ between the first rotating shaft and a center of gravity of the first link, the distance $D_2$ between the second rotating shaft and a center of gravity of the second link, a gravitational acceleration g, a spring constant k of the spring, a distance h between the first rotating shaft and the third rotating shaft, and a distance p between the first rotating shaft and the fourth rotating shaft satisfy $$k = \frac{\{m_1 g D_1 + m_2 g (L - D_2)\}}{hp}.$$

4. The arm structure according to claim 1, wherein the gravity compensation mechanism includes:
   a guide pivotally attached to the base via a third rotating shaft located above the first rotating shaft;
   a rod supported by the guide, the rod being slidable with respect to the guide, one end side of the rod pivotally attached to the first link via a fourth rotating shaft located below the guide, the fourth rotating shaft being located between the first rotating shaft and the second rotating shaft, the rod moving in an axial direction of the rod according to the rotation of the first link;
   a spring receiving portion provided on another end side of the rod; and
   a spring provided between the guide and the spring receiving portion, an elastic force balancing with the torque being generated by changing a length of the spring in response to a movement of the rod in the axial direction.

5. The arm structure according to claim 4, wherein
   a length of the first link being same as a length of the second link,
   a rotation angle of the second link being twice a rotation angle of the first link, and
   a weight $m_1$ of the first link, a weight $m_2$ of the second link, a length L of each of the first link and the second link, a distance $D_1$ between the first rotating shaft and a center of gravity of the first link, the distance $D_2$ between the second rotating shaft and a center of gravity of the second link, a gravitational acceleration g, a spring constant k of the spring, a distance h between the first rotating shaft and the third rotating shaft, and a distance p between the first rotating shaft and the fourth rotating shaft satisfy $$k = \frac{\{m_1 g D_1 + m_2 g (L - D_2)\}}{hp}.$$

6. The arm structure according to claim 1, wherein the first direction is along a horizontal direction.

7. The arm structure according to claim 1, further comprising a hand pivotally attached to the other end side of the second link via a fifth rotating shaft,
   the hand moves in a horizontal direction according to the rotation of the first link.

8. The arm structure according to claim 1, wherein the connecting member is endless.

9. The arm structure according to claim 1, further comprising:
   a first pulley provided on the first rotating shaft; and
   a second pulley provided on the second rotating shaft,
   the connecting member being a belt or a chain,
   the connecting member connecting the first pulley and the second pulley.

10. The arm structure according to claim 1, wherein the torque includes first torque generated by weight of the first link and second torque generated by weight of the second link.

11. A transferring apparatus comprising:
    an automatic guided vehicle; and the arm structure according to claim 1 mounted on the automatic guided vehicle.

12. An arm structure comprising:
a base;
a first link rotatable in a vertical direction, one end side of the first link being pivotally attached to the base via a first rotating shaft;
a second link rotatable in the vertical direction, one end side of the second link being pivotally attached to another end side of the first link via, a second rotating shaft;
a connecting member connecting the first rotating shaft and the second rotating shaft so that the second link rotates around the second rotating shaft according to a rotation of the first link around the first rotating shaft, a rotation direction of the second link being opposite to a rotation direction of the first link;
a gravity compensation mechanism connected to the base and the first link, the gravity compensation mechanism compensating for torque generated around the first rotating shaft by gravity; and
a hand pivotally attached to another end side of the second link via a fifth rotating shaft, wherein
the hand moves in a first direction according to the rotation of the first link,
the first direction crosses the vertical direction.

13. The arm structure according to claim 12, wherein the gravity compensation mechanism includes:
a guide pivotally attached to the base via a third rotating shaft located below the first rotating shaft;
a rod supported by the guide, the rod being slidable with respect to the guide, one end side of the rod being pivotally attached to the one end side of the first link via a fourth rotating shaft located above the guide, the first rotating shaft being located between the second rotating shaft and the fourth rotating shaft, the rod moving in an axial direction of the rod according to the rotation of the first link;
a spring receiving portion provided on another end side of the rod; and
a spring provided between the guide and the spring receiving portion, an elastic force balancing with the torque being generated by changing a length of the spring in response to a movement of the rod.

14. The arm structure according to claim 13, wherein
a length of the first link being same as a length of the second link,
a rotation angle of the second link being twice a rotation angle of the first link, and
a weight $m_1$ of the first link, a weight $m_2$ of the second link, a length L of each of the first link and the second link, a distance $D_1$ between the first rotating shaft and a center of gravity of the first link, the distance $D_2$ between the second rotating shaft and a center of gravity of the second link, a gravitational acceleration g, a spring constant k of the spring, a distance h between the first rotating shaft and the third rotating shaft, and a distance p between the first rotating shaft and the fourth rotating shaft satisfy $$k = \frac{\{m_1 g D_1 + m_2 g (L - D_2)\}}{hp}.$$

15. The arm structure according to claim 12, wherein the gravity compensation mechanism includes:
a guide pivotally attached to the base via a third rotating shaft located above the first rotating shaft;
a rod supported by the guide, the rod being slidable with respect to the guide, one end side of the rod pivotally attached to the first link via a fourth rotating shaft located below the guide, the fourth rotating shaft being located between the first rotating shaft and the second rotating shaft, the rod moving in an axial direction of the rod according to the rotation of the first link;
a spring receiving portion provided on another end side of the rod; and
a spring provided between the guide and the spring receiving portion, an elastic force balancing with the torque being generated by changing a length of the spring in response to a movement of the rod in the axial direction.

16. The arm structure according to claim 15, wherein
a length of the first link being same as a length of the second link,
a rotation angle of the second link being twice a rotation angle of the first link, and
a weight $m_1$ of the first link, a weight $m_2$ of the second link, a length L of each of the first link and the second link, a distance $D_1$ between the first rotating shaft and a center of gravity of the first link, the distance $D_2$ between the second rotating shaft and a center of gravity of the second link, a gravitational acceleration g, a spring constant k of the spring, a distance h between the first rotating shaft and the third rotating shaft, and a distance p between the first rotating shaft and the fourth rotating shaft satisfy $$k = \frac{\{m_1 g D_1 + m_2 g (L - D_2)\}}{hp}.$$

17. The arm structure according to claim 12, wherein the first direction is along a horizontal direction.

18. The arm structure according to claim 12, wherein the connecting member is endless.

19. The arm structure according to claim 12, further comprising:
a first pulley provided on the first rotating shaft; and
a second pulley provided on the second rotating shaft,
the connecting member being a belt or a chain,
the connecting member connecting the first pulley and the second pulley.

20. The arm structure according to claim 12, wherein the torque includes first torque generated by weight of the first link and second torque generated by weight of the second link.

21. A transferring apparatus comprising:
an automatic guided vehicle; and
the arm structure according to claim 12 mounted on the automatic guided vehicle.

22. An arm structure comprising:
a base;
a first link rotatable in a vertical direction, one end side of the first link being pivotally attached to the base via a first rotating shaft;
a second link rotatable in the vertical direction, one end side of the second link being pivotally attached to another end side of the first link via a second rotating shaft, a length of the first link being same as a length of the second link;

a connecting member connecting the first rotating shaft and the second rotating shaft, when the first link rotates around the first rotating shaft, the second link rotating around the second rotating shaft, a rotation angle of the second link being twice a rotation angle of the first link, a rotation direction of the second link being opposite to a rotation direction of the first link; and a gravity compensation mechanism connected to the base and the first link, the gravity compensation mechanism compensating for torque generated around the first rotating shaft by gravity, the gravity compensation mechanism including:

a guide pivotally attached to the base via a third rotating shaft located below the first rotating shaft, a rod supported by the guide, the rod being slidable with respect to the guide, one end side of the rod being pivotally attached to the one end side of the first link via a fourth rotating shaft located above the guide, the first rotating shaft being located between the second rotating shaft and the fourth rotating shaft, the rod moving in an axial direction of the rod according to the rotation of the first link, a spring receiving portion provided on another end side of the rod, and a spring provided between the guide and the spring receiving portion, an elastic force balancing with the torque being generated by changing a length of the spring in response to a movement of the rod, wherein a weight $m_1$ of the first link, a weight $m_2$ of the second link, a length L of each of the first link and the second link, a distance $D_1$ between the first rotating shaft and a center of gravity of the first link, the distance $D_2$ between the second rotating shaft and a center of gravity of the second link, a gravitational acceleration g, a spring constant k of the spring, a distance h between the first rotating shaft and the third rotating shaft, and a distance p between the first rotating shaft and the fourth rotating shaft satisfy $$k = \frac{\{m_1 g D_1 + m_2 g (L - D_2)\}}{hp}.$$

23. An arm structure comprising:
a base;
a first link rotatable in a vertical direction, one end side of the first link being pivotally attached to the base via a first rotating shaft;
a second link rotatable in the vertical direction, one end side of the second link being pivotally attached to another end side of the first link via a second rotating shaft, a length of the first link being same as a length of the second link;
a connecting member connecting the first rotating shaft and the second rotating shaft, when the first link rotates around the first rotating shaft, the second link rotating around the second rotating shaft, a rotation angle of the second link being twice a rotation angle of the first link, a rotation direction of the second link being opposite to a rotation direction of the first link; and
a gravity compensation mechanism connected to the base and the first link, the gravity compensation mechanism compensating for torque generated around the first rotating shaft by gravity, wherein when the first link rotates around the first rotating shaft, another end side of the second link moves in a horizontal direction.

24. An arm structure comprising:
a base;
a first link rotatable in a vertical direction, one end side of the first link being pivotally attached to the base via a first rotating shaft;
a second link rotatable in the vertical direction, one end side of the second link being pivotally attached to another end side of the first link via a second rotating shaft, a length of the first link being same as a length of the second link;
a connecting member connecting the first rotating shaft and the second rotating shaft, when the first link rotates around the first rotating shaft, the second link rotating around the second rotating shaft, a rotation angle of the second link being twice a rotation angle of the first link, a rotation direction of the second link being opposite to a rotation direction of the first link;
a gravity compensation mechanism connected to the base and the first link, the gravity compensation mechanism compensating for torque generated around the first rotating shaft by gravity; and
a hand pivotally attached to another end side of the second link via a fifth rotating shaft, wherein
when the first link rotates around the first rotating shaft, the hand moves in a horizontal direction.

25. An arm structure comprising:
a base;
a first link rotatable in a vertical direction, one end side of the first link being pivotally attached to the base via a first rotating shaft;
a second link rotatable in the vertical direction, one end side of the second link being pivotally attached to another end side of the first link via a second rotating shaft;
a connecting member connecting the first rotating shaft and the second rotating shaft, when the first link rotates around the first rotating shaft, the second link rotating around the second rotating shaft, a rotation direction of the second link being opposite to a rotation direction of the first link; and
a gravity compensation mechanism connected to the base and the first link, the gravity compensation mechanism compensating for torque generated around the first rotating shaft by gravity, wherein
when the first link rotates around the first rotating shaft, another end side of the second link moves in a first direction crossing the vertical direction,
the gravity compensation mechanism includes:
a guide pivotally attached to the base via a third rotating shaft located below the first rotating shaft,
a rod supported by the guide, the rod being slidable with respect to the guide, one end side of the rod being pivotally attached to the one end side of the first link via a fourth rotating shaft located above the guide, the first rotating shaft being located between the second rotating shaft and the fourth rotating shaft, the rod moving in an axial direction of the rod according to a rotation of the first link,
a spring receiving portion provided on another end side of the rod, and
a spring provided between the guide and the spring receiving portion, an elastic force balancing with the torque being generated by changing a length of the spring in response to a movement of the rod.

26. The arm structure according to claim 25, wherein, when the first link rotates around the first rotating shaft, the other end side of the second link moves in a horizontal direction.

27. The arm structure according to claim 25, further comprising a hand pivotally attached to the other end side of the second link via a fifth rotating shaft,
   when the first link rotates around the first rotating shaft, the hand moves in a horizontal direction.

28. The arm structure according to claim 25, wherein the connecting member is endless.

29. The arm structure according to claim 25, further comprising:
   a first pulley provided on the first rotating shaft; and
   a second pulley provided on the second rotating shaft,
   the connecting member being a belt or a chain,
   the connecting member connecting the first pulley and the second pulley.

30. A transferring apparatus comprising:
   an automatic guided vehicle; and
   the arm structure according to claim 25 mounted on the automatic guided vehicle.

* * * * *